June 18, 1968 R. L. SHAW 3,389,238
APPARATUS AND METHOD FOR WELDING SUBMERGED
PIPES BY INDUCTION HEATING
Filed Nov. 20, 1964

INVENTOR.
ROBERT L. SHAW
BY Tilberry & Body
ATTORNEYS 3,389,238
APPARATUS AND METHOD FOR WELDING SUB-
MERGED PIPES BY INDUCTION HEATING
Robert L. Shaw, Mentor Lake, Ohio, assignor to Park-
Ohio Industries, Inc., a corporation of Ohio
Filed Nov. 20, 1964, Ser. No. 412,763
13 Claims. (Cl. 219—9.5)

ABSTRACT OF THE DISCLOSURE

A method and apparatus for pressure welding the ends of a pipe which is submerged in a liquid. A porous sleeve is wrapped around the joint formed by the ends of the pipe. A nonporous sleeve is then utilized to surround the porous sleeve being coterminous therewith. An inductor surrounds the nonporous sleeve and is supplied with heating current. Pressure applying means are utilized to effect the pressure weld.

---

The present invention pertains to the art of induction heating and more particularly to an apparatus and method for welding submerged pipes by induction heating.

The invention is particularly applicable to pressure welding abutting pipes, or pipe sections, submerged in a liquid, such as sea water, and the invention will be described with particular reference thereto; however, it is to be appreciated that the invention has much broader applications and can be used for pressure welding the abutting ends of various elongated workpieces submerged within other liquids.

The term "pipe" or "pipe section" as used herein refers generally to elongated, tubular workpieces; however, the term is also intended to broadly include solid elongated workpieces, such as rods and bars, when they are being pressure welded by the apparatus and method herein defined.

With the discovery of oil fields beneath ocean beds and with the construction of numerous underwater installations, such as water supply systems, it has become somewhat common practice to install pipes beneath the surface of salt or fresh water. In making installations of pipe under water, it was somewhat common practice to weld sections of pipe together above the water and, then, lower and install the welded pipe beneath the water surface. In many instances, this procedure has proven quite awkward, if not impossible. Consequently, it has become desirable to develop a method and apparatus for butt welding sections of pipe together after the pipe sections are laid beneath the surface of the water. Many methods and apparatus have been tried, such as arc welding, gas welding and induction pressure welding. Each of these prior methods have had certain disadvantages and they have not been, heretofore, completely satisfactory for general use in the field.

It has become common in above water applications to weld pipe sections by inductively heating the ends of the pipe and then pressure welding these heated ends. Since this method has proven satisfactory in other pipe welding applications, many attempts have been made to use induction heating for welding pipes together under water. These attempts at underwater welding generally included the use of an inductor surrounding the joint between the pipe sections and a source of high frequency alternating current for energizing the inductor. The abutting ends of the pipe sections were heated while under water and pressure was applied between the pipe sections to butt weld the sections together; however, this method was not successful for various reasons. For instance, vapor pockets formed around the heated area of the pipe sections. These vapor pockets caused heat insulation of the heated areas and prevented uniform welding of the joint. In addition, the liquid around the pipe sections cooled the heated areas of the pipe sections in some localities.

The present invention is directed toward a method and apparatus for butt welding the ends of pipe sections under water, primarily salt water, by induction heating which method and apparatus overcome the above-mentioned, and other disadvantages of prior attempts to accomplish this desired end.

In accordance with the present invention there is provided an induction heating apparatus for welding the abutting ends of two metal pipes while the abutting ends are submerged in a liquid, the apparatus includes a porous sleeve surrounding the abutting ends and covering the joint between the ends, a non-porous, sleeve-like member surrounding the porous sleeve and coterminous therewith, means for clamping the non-porous sleeve against the porous sleeve to hold the porous sleeve firmly against the abutting ends and an inductor means surrounding the nonporous sleeve in the vicinity of the joint between the ends for heating the ends adjacent the joint to a pressure welding temperature.

In accordance with another aspect of the present invention there is provided a method of welding the abutting ends of two metal pipes while the abutting ends are submerged in a liquid, the method comprises the steps of: forming a porous, nonconduction barrier around the joint between the ends, compressing the barrier against the ends with only selected small area portions of the barrier being directly in contact with the liquid, inductively heating the abutting ends to a pressure welding temperature, applying an axial force on the ends to pressure weld the same at the joint while vapor formed at the joint progresses from the joint, through the barrier, and out the small area portions to prevent unvaporized liquid from progressing through the barrier into contact with the joint.

The primary object of the present invention is the provision of a method and apparatus for welding pipe sections in a liquid by induction heating, which method and apparatus produces a uniform welded joint.

Another object of the present invention is the provision of a method and apparatus for welding pipe sections in a liquid by induction heating, which method and apparatus is economical in use and can be easily performed in remote locations beneath the surface of the liquid.

Another object of the present invention is the provision of a method and apparatus for welding pipe sections in a liquid by induction heating, which method and apparatus involves the provision of a porous, nonconductive sleeve applied against the outside of the pipe sections in the vicinity of the joint to be welded to allow flow of vapor from the joint as it is heated and, simultaneously, to inhibit the flow of liquid to the heated joint area.

These and other objects and advantages will become apparent from the following description used to illustrate the preferred embodiments of the invention as read in connection with the accompanying drawing in which.

Figure 1:
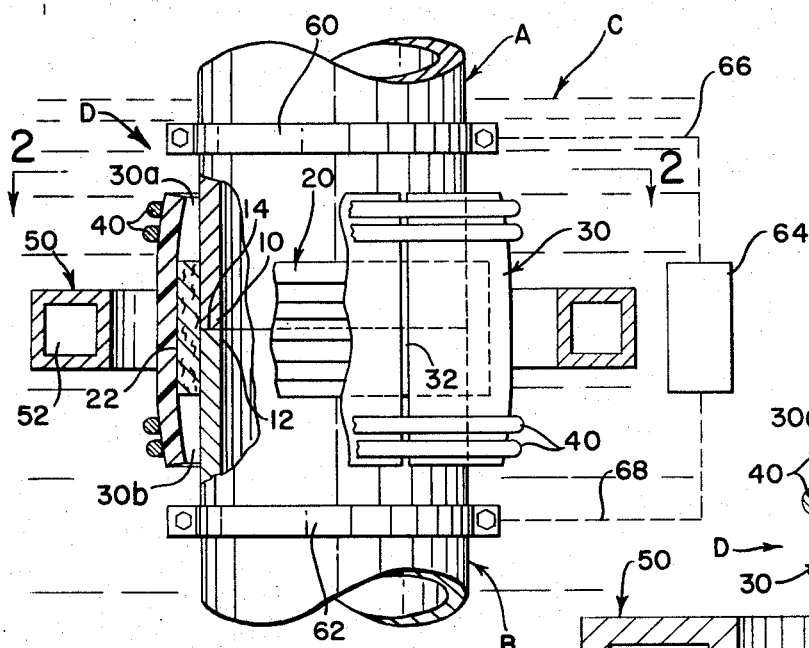
FIGURE 1 is a partially cross-sectioned, somewhat schematic side-elevational view showing the preferred embodiment of the present invention.
Figure 2:
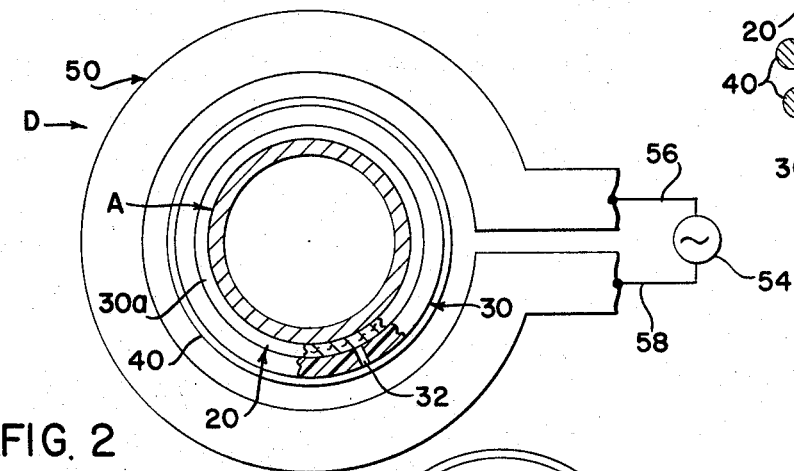
FIGURE 2 is a cross-sectional view taken generally along line 2—2 of FIGURE 1.

Referring now to the drawing wherein the showings are for the purpose of illustrating preferred embodiments of the invention only, and not for the purpose of limiting same, FIGURES 1 and 2 show two vertically extending pipe sections A, B submerged within a liquid C, such as salt or fresh water. In accordance with the preferred embodiment of the present invention, an apparatus D is utilized for welding the abutting ends 10, 12 of pipe sections A, B, respectively, at joint 14. It is to be appreciated that the term "ends" refers to the portion of pipe sections A, B immediately adjacent the joint 14.

Apparatus D, as illustrated, includes a porous, nonconductive sleeve 20 which, in accordance with the preferred embodiment of the present invention, includes a tape 22 formed from a porous asbestos material and wrapped around ends 10, 12 in overlapping convolutions to completely cover the joint 14 and ends 10, 12. For illustrative purposes, the wrapping of the tape 22 is shown in enlarged proportions in FIGURE 3. The axial length of sleeve 20 may be varied; however, the sleeve extends axially on both sides of joint 14 a substantial distance to completely isolate the joint from the liquid C on the outside of the pipe sections A, B.

Around the sleeve 20 there is provided a nonporous, nonconductive sleeve 30 which, in accordance with the preferred embodiment of the present invention, is formed from the plastic substances known as nylon or Teflon. It is appreciated that the terms "porous" and "nonporous" are somewhat relative in nature; however, in accordance with the invention, "porous" indicates a material which will easily allow the passage of liquid or vapor therethrough. "Nonporous" indicates a material which will substantially block the flow of liquid or vapor therethrough. Nonporous sleeve 30 includes an axially extending slit 32 so that the sleeve may be wrapped around the pipe sections after the pipe sections are placed in the position shown in FIGURE 1 and after the tape 22 is wrapped around the pipe sections. The slit 32 also allows the sleeve 30 to be compressed inwardly against the sleeve 20 so that the nonporous sleeve can exert a compressive force on porous sleeve 20. In this manner, the sleeve 20 is held tightly against the outer surface of the pipe sections. To secure the sleeve 30 in this compressive condition, there are provided a plurality of nonmagnetic, nonconductive bands 40. It is appreciated that other arrangements could be utilized for compressing the sleeve 30 into tight relationship with sleeve 20.

As so far described, the porous sleeve 20 lies in tight engagement with the outer surface of ends 10, 12. Even though sleeve 30 is compressed inwardly, there is still provided axially spaced, annular passages 30a, 30b, which passages allow liquid flow into the porous sleeve. Thus, liquid will be in contact with the ends 10, 12 before the heating process starts. The porous sleeve 20 and the nonporous compression sleeve 30 hold the sections A, B in proper alignment during the subsequent welding operation, to be hereinafter described in detail.

Surrounding sleeve 30 and directly opposite joint 14 there is provided a single turn inductor 50 having an internal coolant passage 52. It is appreciated that, in many instances, the inductor will be cooled by liquid C without requiring the internal coolant passage 52. When the welding operation is taking place a substantial distance below the surface of liquid C, it is not feasible to pump a coolant fluid through passage 52 in a manner commonly used in the induction heating art. Thus, passage 52 can be and generally is eliminated. The inductor 50 is connected to a source of high frequency, alternating current, schematically represented as a generator 54 connected onto the inductor 50 by leads 56, 58. It is appreciated that in many instances the leads 56, 58 may be 100 to 200 feet in length to accommodate welding at great distances below the surface of the liquid C.

When inductor 50 is energized, the ends 10, 12 are heated by known induction heating principles to a pressure welding temperature. Thereafter, or simultaneously therewith, a force is exerted between sections A, B to effect welding at joint 14. When the sections are vertically mounted, as shown in FIGURE 1, the weight of section A often is sufficient to cause welding at the heated joint 14. However, if the pipe sections are relatively light or if they are horizontally disposed, it may be necessary to provide an auxiliary device for creating the pressure welding force between the pipe sections. Various force creating devices could be utilized; however, for illustrative purposes only, there is illustrated in FIGURE 1 a schematic device for causing force between the pipe sections. This device includes a clamp 60 secured to section A, a clamp 62 secured to section B and a force developing device 64 connected onto clamps 60, 62 by lines 66, 68, respectively. In operation, the device 64 exerts a force on clamps 60, 62 to draw the sections A, B together for the purpose of welding the joint 14. It is appreciated that various mechanisms could be utilized for this purpose.

Figure 3:
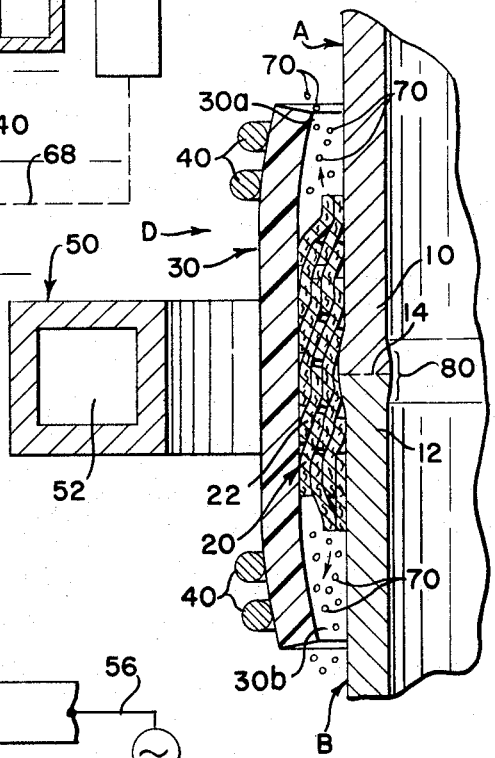
FIGURE 3 is an enlarged cross-sectional view showing in more detail the operating characteristics of the preferred embodiment of the present invention, as shown in FIGURES 1 and 2.

In operation of the invention, as the ends 10, 12 are heated, the liquid C in contact with these ends is vaporized. Referring now to FIGURE 3, the vapor created passes through the porous sleeve 20 and exits through annular passages 30a, 30b as vapor bubbles 70. These vapor bubbles are generally sufficient in number and volume to prevent an in-rush of liquid C through the sleeve 20. It has been found that by allowing the outward flow of vapor, while inhibiting the inward flow of liquid, a substantially more uniform weld is formed at joint 14. When device 64 applies an axial force on the heated pipe sections or when gravity creates such an axial force, the joint 14 is upset slightly to form an upset portion 80, as shown in FIGURE 3.

The provision of an outer nonporous, compression sleeve 30 limits the portions of sleeve 20 which are in contact with the liquid C; therefore, only small areas of the sleeve 20 can allow ingress of liquid or egress of vapor. In operation, these small areas are utilized for the passage of the vapor bubbles 70 and, in turn, these vapor bubbles prevent a substantial amount of liquid from passing through the sleeve 20 into contact with the heated joint 14. This arrangement has been proven to substantially increase the uniformity of a joint formed under water so that, by using the present invention, induction heating can be easily and successfully adapted for the underwater welding of pipe sections.

Figure 4:
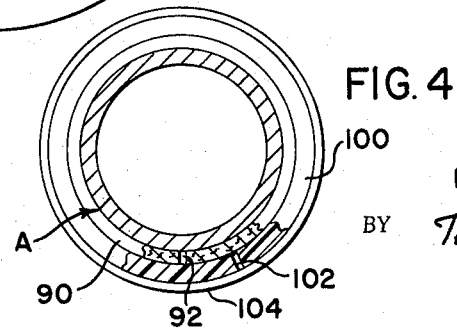
FIGURE 4 is a cross-sectional view showing, somewhat schematically, a modification of the preferred embodiment of the present invention as shown in FIGURES 1–3.

Referring now to FIGURE 4, a modification of the present invention is illustrated. A porous, nonconductive sleeve 90 is formed from a single asbestos sheet or a similar material and has a slit 92. Around the sleeve 90 there is provided a nonporous, nonconductive, compression sleeve 100 having a slit 102 and compressed against sleeve 90 by nonconductive bands 104. The slits 92, 102 are circumferentially spaced with respect to each other so that liquid cannot flow directly into contact with the abutting ends of the pipe sections during the welding operation. It is appreciated that the embodiment of the present invention shown in FIGURE 4, is substantially the same as the embodiment of the invention shown in FIGURES 1–3, with the exception that the sleeve 90 is formed from a single sheet of asbestos material instead of wrapped from an asbestos tape. The operation of this embodiment of the invention would not differ substantially from the operation of the previously discussed embodiment; therefore, further discussion thereof is not necessary.

The present invention has been described in connection with certain structural embodiments; however, it is appreciated that these embodiments may be changed without departing from the intended spirit and scope of the present invention as defined in the appended claims.

Having thus described my invention, I claim:

1. An induction heating apparatus for welding the abutting ends of two metal pipes while said abutting ends are submerged in a liquid, said apparatus comprising a porous sleeve surrounding said abutting ends, and covering the joint between said ends, a nonporous, sleeve-like member surrounding said porous sleeve and coterminous therewith, means for clamping said nonporous sleeve against said porous sleeve to hold said porous sleeve firmly against said abutting ends, an inductor means surrounding said nonporous sleeve radially opposite said joint between said ends for heating said ends adjacent said joint to a pressure welding temperature and means for forcing said ends together to produce a pressure weld.

2. An induction heating apparatus as defined in claim 1 wherein said porous sleeve is formed from porous heat insulating, nonmagnetic material.

3. An induction heating apparatus as defined in claim 1 wherein said porous sleeve is formed from asbestos.

4. An induction heating apparatus as defined in claim 1 wherein said porous sleeve is formed from an asbestos tape wrapped around said abutting ends in overlapping convolutions.

5. An induction heating apparatus as defined in claim 1 wherein said nonporous sleeve is formed from a plastic, nonmagnetic material.

6. An induction heating apparatus as defined in claim 1 wherein said nonporous sleeve is formed from Teflon.

7. An induction heating apparatus as defined in claim 1 wherein said nonporous sleeve is formed from nylon.

8. An induction heating apparatus as defined in claim 1 wherein said porous sleeve has an axially extending slit, said nonporous sleeve has an axially extending slit and said slits being circumferentially spaced from each other.

9. An induction heating apparatus as defined in claim 1 wherein said nonporous sleeve includes two axially spaced ends, said axially spaced ends of said nonporous sleeve being substantially spaced radially from said abutting ends to form annular vapor outlet passages.

10. An induction heating apparatus as defined in claim 1 wherein clamping means includes nonconductive bands wrapped under tension around said nonporous sleeve.

11. A method of welding the abutting ends of two metal pipes while said abutting ends are submerged in a liquid, said method comprising the steps of: forming a porous, nonconductive barrier around the joint between said ends, compressing said barrier against said ends with only selected small area portions of said barrier being directly in contact with said liquid, inductively heating said abutting ends to a pressure welding temperature, applying an axial force on said ends to pressure weld the same at said joint while vapor formed at the joint progresses from said joint, through said barrier, and out to said small area portions to inhibit unvaporized liquid from progressing through said barrier into contact with said joint.

12. A method of welding the abutting ends of two metal pipes while said abutting ends are submerged in a liquid, said method comprising the steps of: placing a porous, nonconductive sleeve around said ends and extending across the joint formed between said ends, covering said porous sleeve with only selected small area portions of said barrier being directly in contact with said liquid, compressing said porous sleeve against said ends, inductively heating said abutting ends to a pressure welding temperature, applying an axial force at said joint while vapor formed at the joint progresses from said joint, through said sleeve, and out said small area portions to inhibit unvaporized liquid from progressing through said porous sleeve into contact with said joint.

13. A method of welding the abutting ends of two metal pipes while said abutting ends are submerged in a liquid, said method comprising the steps of: wrapping a porous, nonconductive tape in overlapping convolutions around said ends and across the joint between said ends, placing a plastic, heat resistant sleeve around said wrapped tape, clamping said sleeve around said tape to leave axially spaced areas of said tape exposed to said liquid, inductively heating said abutting ends to a pressure welding temperature, applying an axial force at said joint between said ends while vapor formed at the joint progresses from said joint, through said wrapped tape, and out said exposed areas to inhibit unvaporized liquid from progressing through said porous, wrapped tape into contact with said joint.

References Cited

UNITED STATES PATENTS 2,805,316  9/1957  Chapman _____ 219—9.5 X

RICHARD M. WOOD, *Primary Examiner.*

B. A. STEIN, *Assistant Examiner.*